(12) United States Patent
Quail et al.

(10) Patent No.: US 7,580,771 B2
(45) Date of Patent: Aug. 25, 2009

(54) INTELLIGENT MOLDING ENVIRONMENT AND METHOD OF CONFIGURING A MOLDING SYSTEM

(75) Inventors: John P. Quail, Toronto (CA); Stefano M. Saggese, Brampton (CA); Bruce C. Dearling, Strassen (LU)

(73) Assignee: Husky Injection Molding Systems Ltd., Bolton, ON (CA)

( * ) Notice: Subject to any disclaimer, the term of this patent is extended or adjusted under 35 U.S.C. 154(b) by 797 days.

(21) Appl. No.: 10/968,610

(22) Filed: Oct. 19, 2004

(65) Prior Publication Data

US 2006/0082009 A1    Apr. 20, 2006

(51) Int. Cl.
*G06F 19/00* (2006.01)

(52) U.S. Cl. ...................... 700/197; 717/188
(58) Field of Classification Search ............. 700/197, 700/200, 204; 425/162, 143, 445, 434, 526, 425/547; 717/188, 123; 715/200; 164/456; 264/40.1, 328.14
See application file for complete search history.

(56) References Cited

U.S. PATENT DOCUMENTS

| | | | |
|---|---|---|---|
| 4,611,380 A | 9/1986 | Abe et al. |
| 4,816,635 A | 3/1989 | Edamura |
| 4,825,199 A | 4/1989 | Antilozi |
| 5,062,784 A | 11/1991 | Inaba et al. |
| 5,216,617 A | 6/1993 | Kamiguchi et al. |
| 5,222,026 A | 6/1993 | Nakamoto |
| 5,275,768 A | 1/1994 | Inaba et al. |
| 5,426,280 A | 6/1995 | Smith |
| 5,440,363 A | 8/1995 | Minnick et al. |
| 5,488,223 A | 1/1996 | Austin et al. |
| 5,518,671 A | 5/1996 | Takizawa et al. |

(Continued)

FOREIGN PATENT DOCUMENTS

CA    2327759 A1    5/2001

(Continued)

OTHER PUBLICATIONS

Page art: K Show Preview: Mold monitor records process data, Canplastics.com, published Oct. 7, 2004.

(Continued)

*Primary Examiner*—Kidest Bahta

(57) ABSTRACT

An injection molding machine, including: a human machine interface being configured to provide graphical representation of a status of the injection molding machine; a machine controller being configured to: (i) provide operational control of the injection molding machine, (ii) operationally couple with the human machine interface, the machine controller having: (i) a machine-controller processor; and (ii) machine-controller memory being coupled with the machine-controller processor; an injection unit being configured to plasticizing and inject a molding material; a tie-bar clamping mechanism being associated with the injection unit; and a mold assembly being supported by the tie-bar clamping mechanism, the mold assembly being coupled with the injection unit, the mold assembly being adapted to receive the molding material from the injection unit so that a molded article may be molded, and the mold assembly including: a mold assembly body; and a mold memory device being coupled with the mold assembly body, and being operatively coupled with the machine controller so that data being stored in the mold memory device may be accessed by the machine controller, the mold memory device including; mold set-up data being related with the molded article to be molded in the mold assembly.

21 Claims, 4 Drawing Sheets

U.S. PATENT DOCUMENTS

| | | | |
|---|---|---|---|
| 5,565,854 A | 10/1996 | Kataoka et al. | |
| 5,595,560 A | 1/1997 | Kamada | |
| 5,795,511 A | 8/1998 | Kalantzis et al. | |
| 5,811,134 A * | 9/1998 | Takizawa | 425/145 |
| 5,898,591 A | 4/1999 | Hettinga et al. | |
| 6,051,170 A * | 4/2000 | Kamiguchi et al. | 264/40.1 |
| 6,073,059 A * | 6/2000 | Hayashi et al. | 700/204 |
| 6,145,022 A * | 11/2000 | Takizawa et al. | 710/10 |
| 6,163,734 A | 12/2000 | Shigefuji et al. | |
| 6,421,577 B1 | 7/2002 | Triplett | |
| 6,529,796 B1 | 3/2003 | Kroeger et al. | |
| 6,904,333 B2 * | 6/2005 | Morimura | 700/197 |
| 6,947,800 B2 | 9/2005 | Flanagan et al. | |
| 7,117,050 B2 * | 10/2006 | Sasaki et al. | 700/83 |
| 7,128,548 B2 | 10/2006 | Manner | |
| 2002/0128744 A1 * | 9/2002 | Nishiyama et al. | 700/200 |
| 2004/0093114 A1 * | 5/2004 | Magario et al. | 700/197 |
| 2004/0206472 A1 * | 10/2004 | Hirata et al. | 164/456 |
| 2004/0256755 A1 * | 12/2004 | Baba et al. | 264/40.1 |
| 2004/0258787 A1 * | 12/2004 | Olaru et al. | 425/143 |
| 2005/0053684 A1 | 3/2005 | Pitscheneder | |
| 2005/0053687 A1 | 3/2005 | Pitscheneder | |
| 2005/0240303 A1 * | 10/2005 | Smith | 700/200 |
| 2005/0283271 A1 | 12/2005 | Dachs | |
| 2006/0037731 A1 * | 2/2006 | Hirata et al. | 164/151.3 |
| 2008/0022874 A1 * | 1/2008 | Silverbrook | 101/330 |

FOREIGN PATENT DOCUMENTS

| | | |
|---|---|---|
| EP | A-0990966 | 5/2000 |
| JP | 6031787 A | 2/1994 |
| WO | 0128752 | 4/2001 |
| WO | 03071880 | 9/2003 |

OTHER PUBLICATIONS

Page art: The Caco Pacific IPM Advances, published Feb. 2000.
Page art: Digi-Mold ID, Plasticsnet.com, Mar. 1, 1999.
Page art: Symphony: Introducing the latest tool for hot runner technology.
International Search Report for PCT/CA2005/001463, dated Jan. 12, 2006, three pages, related to the above-identified US patent application.

* cited by examiner

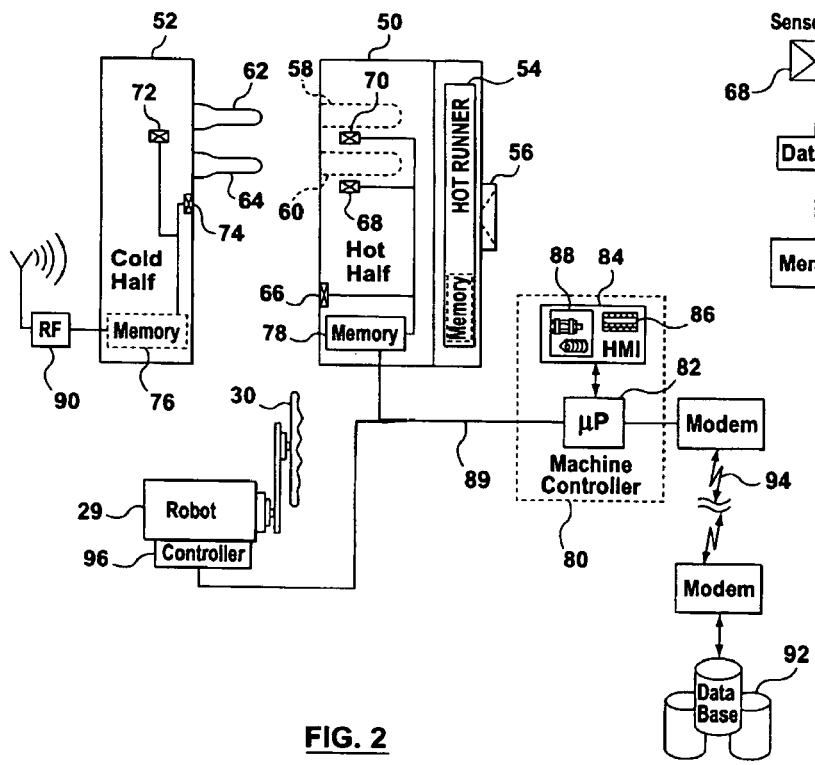
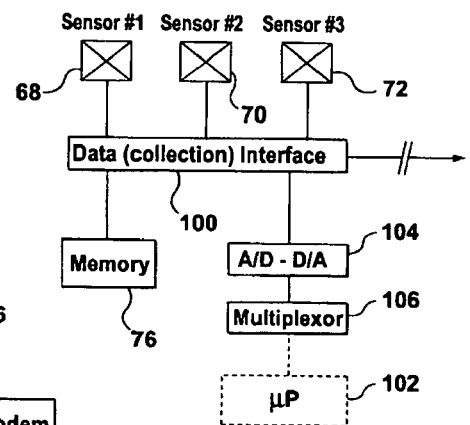
FIG. 2
FIG. 3

INTELLIGENT MOLDING ENVIRONMENT AND METHOD OF CONFIGURING A MOLDING SYSTEM

BACKGROUND OF THE INVENTION

1 Field of the Invention

The present invention relates, in general, to the management of mold operation and the accumulation and use of data to improve all aspects of short-term and long-term mold operation and machine operation/collaboration. More particularly, but not exclusively, the present invention relates to the long-term association of data with a PET mold, which data relates to mold set-up and machine operation and which data is entered into a machine controller either through a human-machine interface (HMI) or from an in-mold memory chip or other storage device permanently associated with the mold.

2 Summary of the Prior Art

In a molding operation, whether this be in an injection molding environment or any similar system using platens and molds, molded part quality is affected by a number of factors, including the physical conditions and configuration of the system equipment and also the processing conditions under which the molded part is formed.

With molds required to run essentially on a continuous, year-long basis and under harsh operating conditions (arising from large temperature ranges and high closure pressures), prior to mold acceptance and delivery, customers generally require that each new or re-conditioned mold be operationally proven in a production-like environment. During such validation, a test rig (defined by the manufacturer so as to ensure effective benchmarking) is set-up for nominally optimum performance of the mold, i.e. in a way that optimizes molded part quality and productivity. Optimization is achieved through process parameter control, including the setting of cavity fill and hold times, which takes considerable time (even for a skilled test technician). Even establishing the initial perceived boundary conditions (in terms of a suitable injection profile) for the production of a particular molded part requires considerable experience.

Unfortunately, the test rig is highly likely to vary in system configuration to the molding machine into which the customer will eventually locate the mold. Consequently, optimization and set-up achieved on the test rig seldom, if ever, translates to a suitable set-up and production optimization on the customer's machine at the customer's site. For example, in the exemplary context of an injection molding machine, the test rig may operate a different plasticizing unit with a different throughput, processing speed or screw diameter. Additionally, an injection molding machine may or may not include a nozzle mixer, or the nozzle mixer could be different between the test rig and the customer's machine. Furthermore, as regards the accumulation, prior to injection of a shot of plastic melt in a shooting pot (or in front of a reciprocating screw system), the volume of the shooting pot may vary between the test rig and customer machine. All of these differing configurations impact process control and optimization.

Other factors that affect set-up and quality (but which are more choice related, rather than system dependent) include resin density, the use of colorants or additives and whether the machine's venting system is operating to specification. As will be understood, colorants and additives are the choice of the customer and affect plastification and hence screw throughput capacity. With respect to venting, each cavity initially contains air that must be purged from the cavity during material injection. With a well-maintained and clean machine, higher fill rates are achieved because air vents from the cavity are initially clear from clogging particulate matter, especially PET dust and the like. With the partial or full blockage of the venting system, cavity pressures increase on a cavity-by-cavity basis and, in the extreme, non-purged air from cavities produces both voids in the molded article and short-weight molded products.

Turning to some more specific aspects related to preform production in a multi-cavity environment, the fill rate of the cavity and injection set-up is critical to preform quality. In this regard, it will be understood that cavity filling is subject to numerous process transition points, particularly exemplified by the transition from velocity fill control (in which speed and position of a plunger in the shooting pot is critical) to pressure control (where preform shrinkage is addressed through the controlled injection of additional molten material). More particularly, the transition points are particularly important to preform geometry in heavier preforms where shrinkage is more significant, although it is noted that thin-walled and relatively lightweight preforms (less than about fifty grams) have particular fill control issues especially associated with the geometry and thickness transition between the elongate wall portion and the neck portion of the preform. Indeed, in the pressure hold portion of the cycle, there are usually multiple transitions to decreasing pressure for stipulated hold times for a particular preform geometry. The fill profile does, therefore, have an overall effect on cycle time.

With any failure to appropriately set-up a fill profile, visually apparent defects can occur in the molded articles. The resulting molded articles, especially in the context of a preform for a bottle or container, is generally of sufficiently impaired quality that the preform is unsaleable. Additionally, a non-optimized system directly affects overall productivity and therefore limits the customer's ability to optimize their return on capital.

Also, in the injection molding field and particularly in relation to preform manufacture, the customer will, over time, almost always modify the mold to produce different components. In terms of stack components, such modification may simply require replacement of a cavity and gate insert, with a neck finish (defined by a neck ring) remaining unchanged. This form of mold conversion would therefore simply change the weight of the preform, since the geometry of the preform is changed by the variation of the length of the cavity or the thickness of the walls of the preform (as principally defined by the cavity). Again, such a change would require the machine set-up to be re-configured, which re-configuration requires time and expertise.

Clearly, any machine down-time or sub-optimum performance is costly to the producer and must therefore be minimized.

In a multi-cavity, preform mold environment, clamp forces typically vary up to about ~600 tons, whereas molding systems in general can require and develop clamp tonnage to many thousands of tons of closure pressure for larger applications. These closure forces are seen across the entire mold and the stack components within the mold and are developed to counter-balance the injection pressures seen in the mold as melt is injected into the cavity. Should there be any misalignment in the components, the applied pressures are sufficient to cause premature wear of the mold, which wear can result in component failure or, more typically and initially, "flash". As will be understood, "flash" is the undesired leakage of plastic melt from the molding system (typically from non-parallelism and misalignment). Flash accelerates the effects of component wear and, invariably, produces directly unusable molded parts.

To date, while molding machine operation is processor-controlled (such as described in EP-A-0990966, the overall system has operated in a limited closed-loop control environment in which centralized control (at a system-wide controller) makes use of real-time sensed signals from the machine. For example, thermocouples located within the mold provide a temperature indication to the system controller that reacts by adjusting or compensating heater output within a hot runner of the mold. Such a system is described in U.S. Pat. No. 6,529,796 which also describes the use of a look-up table to provide an incremental step rate at which power is applied to each heater to reflect a desired warm-up curve. Furthermore, U.S. Pat. No. 6,529,796 describes the use of an interactive process manager (or IPM) that is located in a housing fixed to a mold, with the IPM connected to a centralized communications and power unit (containing a computer terminal) through a single connection. Sensors within the mold are coupled to the IPM which can relay signals to the communication and power unit for overall system management control, including alarm signals arising from sensed stack mis-engagement.

Hot runner control is described in U.S. Pat. No. 6,421,577 in which a processor is located within a thermally isolated enclosure coupled to the side of a mold through a junction box. The processor receives signals from sensors within the mold, and controls the operation of mold components (such as heaters and valve components) through the sensing of temperature, pressure and flow.

U.S. Pat. No. 5,795,511 describes a method and apparatus for controlling an injection molding system. The hot-half of a mold includes an associated junction box in which is located a non-volatile memory that stores information specific to the hot half and its thermal control. More specifically, the memory preserves the most recent temperature settings for the hot-half, which information can be later retrieved for subsequent use with the mold. An overall system controller can, however, nevertheless operate independently of the non-volatile memory (should the memory malfunction).

U.S. Pat. No. 5,222,026 describes a die-casting machine which includes a keyboard through which an operator can enter a mold classification. The mold classification therefore allows a controller to access associated, pre-stored operational information. Automatic mold identification is also contemplated through an array of limit switches and their associated contacts located, respectively, on the back of the mold and at an interface on the die-casting machine. With only certain of the limit switches triggered upon contact with the interface, a digital signature is generated that corresponds to the inserted mold. The signature is then interpreted by a system controller. Of course, if the contacts become bent or broken, a false signal will be interpreted at the system controller and the wrong mold set-up installed.

SUMMARY OF THE INVENTION

According to a first aspect of the present invention there is provided a memory device for a molding machine, the memory device associated with mold set-up data relating to an article to be molded, the mold set-up data including information pertaining to at least one of: a fill profile for the article to be molded; and set point control for a mold.

The article to be molded is defined in terms of a plurality of zones having differing thicknesses and geometries. A plurality of weighting factors are designed to at least partially compensate for differing cooling and flow characteristic within the various. The mold set-up data defines the article to be molded in terms of a fill rate for each of the plurality of zones, the fill rate defining a substantially constant speed or flow for a melt front that is anticipated to flow within each of the zones. The mold set-up data in the memory may be accessed through one of: a bar code; a mold reference number providing an index to a look-up table; and a database of information pertaining to a specific mold.

In another aspect of the present invention there is provided a mold component containing a memory device having mold set-up data relating to an article to be molded, the mold component set-up data including information pertaining to at least one of: a fill profile for the article to be molded; and set point control for a mold.

The mold component can be one of: a stack component; a hot runner; a hot half of an injection molding machine; and a cold half of an injection molding machine.

In a further aspect of the present invention there is provided an injection molding machine comprising a mold having a memory device containing associated mold set-up data relating to an article to be molded, the mold set-up data including information pertaining to at least one of: a fill profile for the article to be molded; and set point control for a mold.

In yet another aspect of the present invention there is provided a method of controlling the operation of an molding machine, the method comprising: having a machine controller access a memory device to obtain mold set-up data relating to an article to be molded, the mold set-up data including information pertaining to at least one of: a fill profile for the article to be molded; and set point control for a mold; and configuring operating parameters of the molding machine based on at least one of the fill profile and the set point control data.

The method of controlling the operation of the molding machine may include entering, via an HMI, machine configuration information (such as clamp and shooting pot sizes) to cause modification of an effect on machine operation otherwise to be achieved by the mold set-up data.

In still yet another aspect of the present invention there is provided a computer program element comprising computer program code means to make a machine controller of a molding machine execute procedure to: access a memory device to obtain mold set-up data relating to an article to be molded, the mold set-up data including information pertaining to at least one of: a) a fill profile for the article to be molded; and b) set point control for a mold; and configure operating parameters of the molding machine based on at least one of the fill profile and the set point control data.

The present invention therefore provides a molding system in which there is increased operational control. Moreover, the present invention provides a knowledge-based system that alleviates the complexities of system set-up for varying molded part design, especially in the context of preforms made by multi-cavity molds. Hence, through the provision of an index of processing and part properties, the present invention simplifies set-up and operation of an injection molding machine to an extent where operator expertise is of less significance and machine operation simplified. The present invention therefore achieves quicker and more accurate machine configuration and adjustment.

Furthermore, a preferred embodiment of the present invention can be used to limit the effects of and, indeed, the applied tonnage in the system, thereby promoting reduced component wear, longer-like and lower energy consumption. For example, through the accumulation of historical data, an operator or a intelligent (computer-controlled) system can move towards an optimized profile for applied tonnage and/or a limitation in the maximum applied tonnage for the system. Indeed, in one embodiment, a maximum allowed applied tonnage can be preloaded into the on-board chip, whereby interrogation of that on-board chip by the machine controller limits the maximum tonnage of the system.

In a preferred embodiment, the present invention also beneficially collates historical data that can be analyzed (either remotely or in real time) to assess and/or revise mold and/or machine performance and/or to assist in mold/machine maintenance. This historically stored information can be used for assessing the legitimacy of warranty claims, and in the development of improved systems and system operating parameters.

BRIEF DESCRIPTION OF THE DRAWINGS

Exemplary embodiments of the present invention will now be described with reference to the accompanying drawings, in which:

ii) FIG. 2 is a schematic diagram of an intelligent molding system according a preferred embodiment of the present invention;

Figure 4:
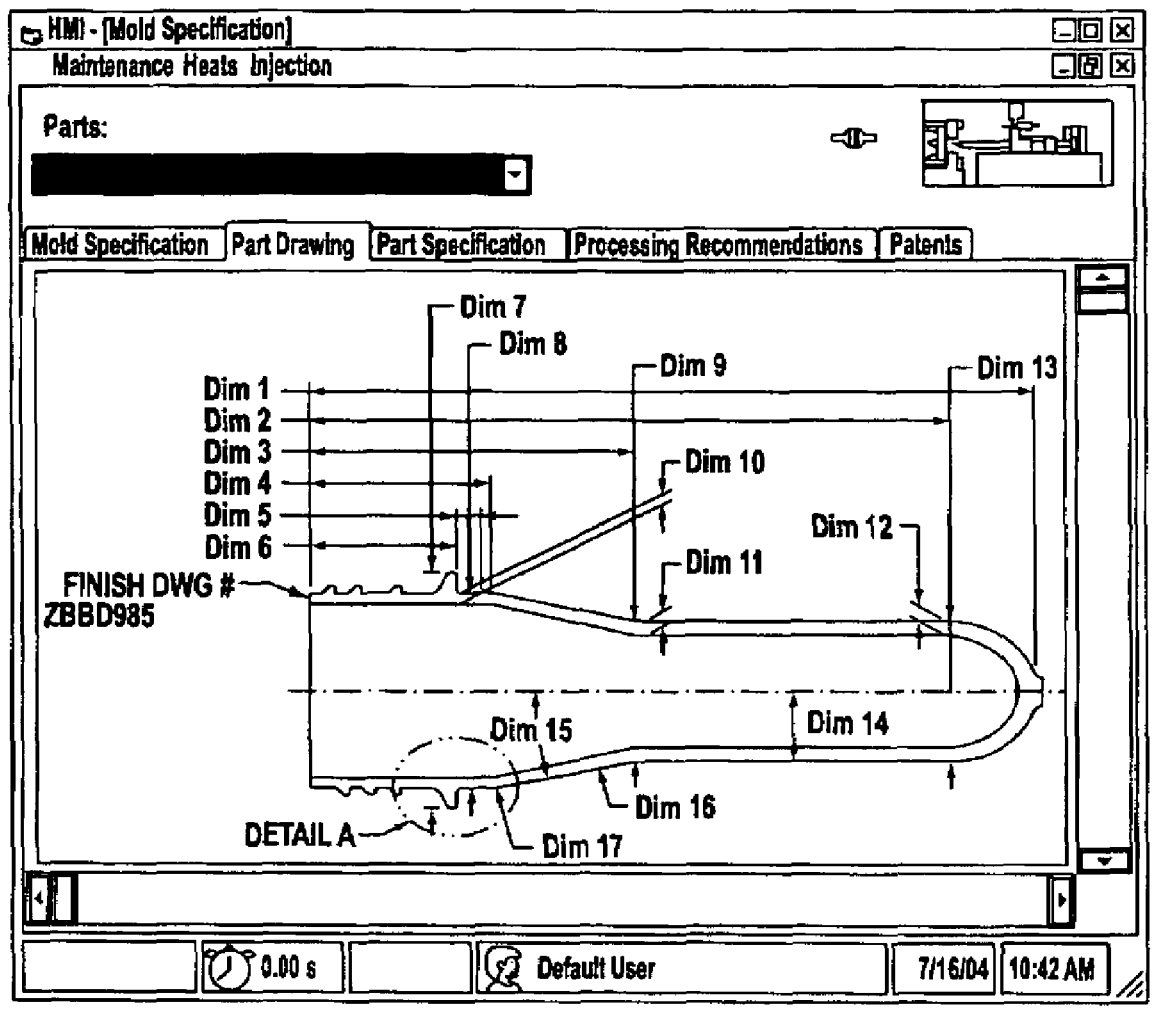
Figure 5:
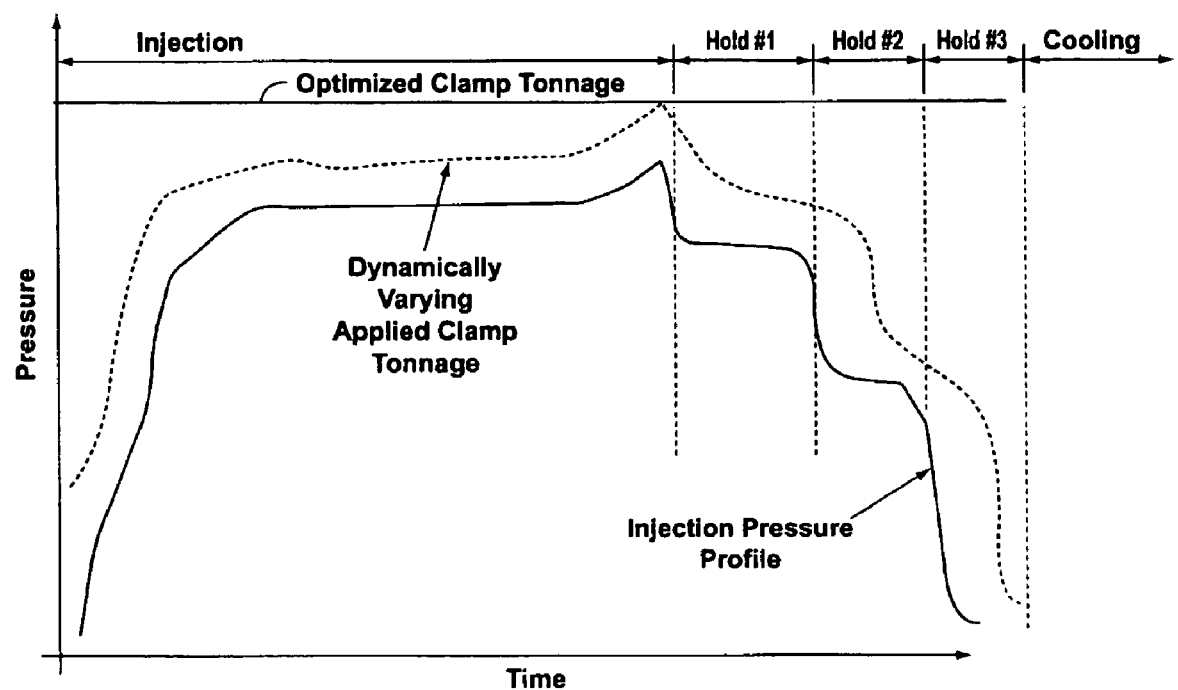

iii) FIG. 3 provides detail of a typical interface for the preferred system architecture of FIG. 2;

iv) FIG. 4 is a screen representation presentable, in accordance with a preferred embodiment of the present invention, on a human-machine interface (HMI) of FIG. 2; and v) FIG. 5 is a graphical representation of applied tonnage against time, as utilized in another embodiment of the present invention.

DETAILED DESCRIPTION OF A PREFERRED EMBODIMENT

Figure 1:
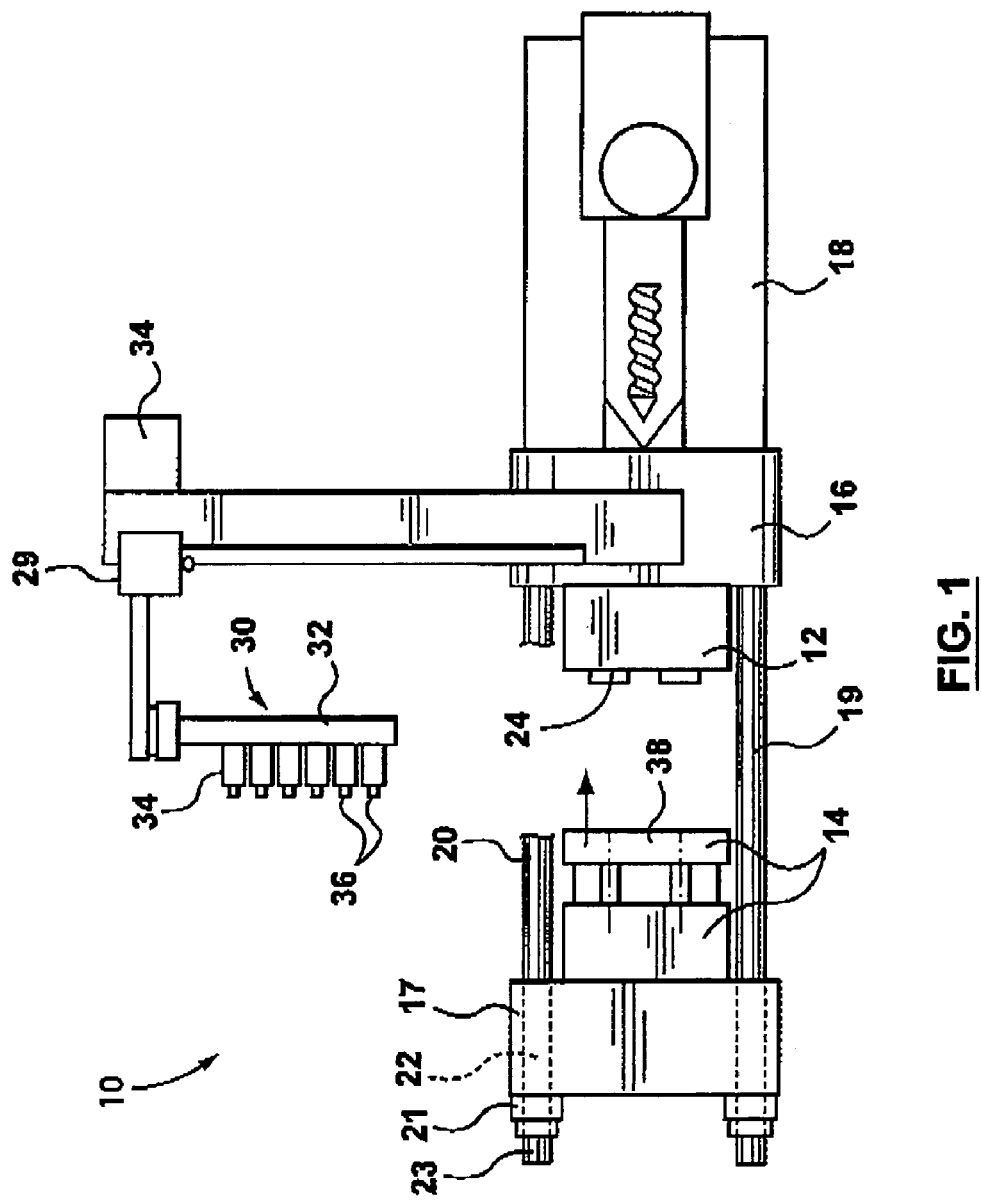
FIG. 1 shows a prior art injection molding machine that can be adapted to support the concepts of the present invention.

FIG. 1 shows a typical injection molding machine 10 (hereafter referred to as the "machine 10") that can be adaptable to support the control processing intelligence of the present invention. As will be understood, during each injection cycle, the machine 10 produces a number of plastic parts corresponding to a mold cavity or cavities defined by complementary mold halves 12,14 located within the machine 10. Overall operational control of the machine 10 is accomplished through use of a machine controller which may be realized by an architecture having distributed intelligence, i.e. multiple interconnected processors that are responsible for the control of individual parts of the molding system. The machine controller is operationally responsible for a human machine interface (shown in FIG. 2) that allows graphical representation of the machine's present or historic status, as well as the entry of information through a touch-screen, keyboard, readable data device (such as a disk drive or CD-ROM) and the like.

The machine 10 includes, without specific limitation, molding structure, such as a fixed platen 16 and a movable platen 17 as well as an injection unit 18 for plasticizing and injecting material. In operation, the movable platen 17 is moved relative to the fixed platen 16 by means of stroke cylinders (not shown) or the like. Clamp force is developed in the machine, as will readily be appreciated, through the use of tie bars 19, 20 and a tie-bar clamping mechanism 21. The tie-bar clamping mechanism 21 is (generally) fixedly attached to the movable platen 17 (typically through the use of bolts), with each clamping mechanism usually extending at least partially into a corresponding bore 22 that extends through the platen at the corners thereof, It is usual that a floating end 23 of the tie bar 19, 20 is free to move relative to the moving platen, with the other remote end anchored into the stationary platen. Of course, in certain systems, the reverse anchoring methodology may be applied.

Referring back to FIG. 1, once the tie-bar is positively engaged in its respective clamp piston, mold clamp force (i.e. closure tonnage) can be applied through the use of (typically) a hydraulic system that is usually directly associated with the clamp piston. Clamp tonnage can also be generated in different ways, including the use of a toggle-clamp arrangement, as will be appreciated.

The mold halves 12, 14 together constitute a mold generally having one or more mold cavities [22,]24, with the mold halves 12,14 each located in one of the movable platen 17 and the fixed platen 16. A robot 29 is provided, adjacent the fixed platen 16 and movable platen 17, to carry an end of arm tool (EOAT) 30, such as a vacuum-based take-out plate 32 or the like. In the particular realisation of a vacuum-based take-out plate 32 for preforms, the vacuum-based take-out plate 32 contains a number of cooling tubes 34 at least corresponding in number to the number of preforms (or molded products) 36 produced in each injection cycle.

In use, in a mold open position (as shown in FIG. 1), the robot 29 moves the EOAT 30 into alignment with, typically, a core side of the mold and then waits until molded articles (e.g. preforms 36) are stripped or otherwise ejected from the core(s) into the EOAT 30 by operation of a stripper plate 38, actuator or lift rods or their functional equivalent.

A preferred embodiment of the present invention is shown, schematically, in FIG. 2. For the sake of clarity, the injection molding machine (including its platens onto which mold halves are fixed) has been omitted. A mold is formed from a hot half 50 and a cold half 52. The hot half includes a melt distribution system, such as a manifold of a hot runner 54, that interfaces to an injection unit through a suitable sprue bushing 56. The hot half 50 includes one or more cavities 58-60 that receive, in use, correspondingly aligned cores 62-64 located on the cold half 52.

At least one, if not both, of the hot half 50 and cold half 52 preferably includes sensors 66, 68, 70, 72, 74. The sensors 66, 68, 70, 72, 74 may monitor pressures, temperatures or other variable parameters associated with mold operation, including contacts representative of operational cycles or stack misalignment. The sensors 66, 68, 70, 72, 74 may be located in dedicated pockets within particular plates of the mold. Alternatively, and as appropriate, sensors may be surfaced mounted (particular those associated with the measurements of applied tonnage). Additionally, certain of the sensors 66, 86, 70, 72, 74, especially those required to measure operational temperatures within the mold half or particular components thereof, including stack components and the hot runner 54, are located on, proximate to or embedded in the component from which it is desired to take measurements.

The number of sensors is limited only to the amount of available space within the mold, the ability to interconnect (i.e. wire together) the sensors and the type of parameter measurements deemed necessary to accomplish effective information gathering or operational control of the component, mold half or mold.

The sensors 66, 68, 70, 72, 74 and their physical connections are resilient to the operational environment and can address the demands of heat, pressure and vibration experienced within a molding machine. In this respect, sensors used in the automotive industry (for engine management purposes)

are considered suitable for application in the present invention. Such sensors are readily known to the skilled addressee in the semiconductor art.

Additionally, at least one (and preferably both) of the hot half 50 and cold half 52 preferably includes at least one memory device 76, 78 for storing information. The memory device may be located in a pocket within the mold half or in a module on the side of the mold. Like the sensors 66-74, the memory device and its physical connections are adapted to withstand the rigours of the injection molding environment, and in this respect the skilled addressee will readily appreciate that reference should be made to the semiconductor art, particularly those used in automotive and engine management-type applications.

The memory devices 76, 78 in each mold half are ultimately responsive to a machine controller 80 which includes suitable control logic and application specific management functions. In this respect, the machine controller 80 may use a local microprocessor 82, although control intelligence could equally be distributed throughout the entire system.

The machine controller 80 is further operationally responsible for a human machine interface (HMI) 84 that provides an operator with an ability to enter information (via a keyboard, touch-screen or readable data entry device 86, such as a CD-ROM drive) and to review/receive information on a suitable display 88. Information stored in the memory devices 76, 78 can therefore be accessed by the machine controller 80, and the storing (i.e. writing) of information into the memory devices is further controlled by the overall control intelligence within the system. With cooperating with the machine controller 80, the memory devices 76, 78 are therefore able to accumulate an historical record of sensed data received from local sensors 66-74 or from other sensing sources, e.g. the machine controller.

Coupling of the memory devices 76, 78 to the machine controller 80 may be through a field bus 89 or the like using either the digital or analog signal domains and using serial, multiplexed or parallel information transfer mechanisms. Equally, wireless technology (such as radio frequency ("RF") technology) can be employed to link the memory devices 76, 78 to the machine controller 80, as represented by the functional antenna and RF block 90.

The memory devices can be realized by any suitable non-volatile memory storage technology, including P-TAG, Datakey and RS-485 multi-drop technologies. In one particular embodiment, the memory devices 76, 78 can be used and implemented independently from the sensors. The memory architecture can be realized by USB-extender connections and USB flash memory which supports a fast serial interface between a memory stick and the machine controller. Remote or interface access to the memory can hence be achieved through any appropriate technology (e.g. Ethernet) readily appreciated by the skilled addressee.

Optionally, the machine controller 80 is further networked to a database 92, which database may be reached via a modem connection 94. The database 92 can be located either at the customer's premises and even within memory allocated to the system controller, or may be remotely located off-site, e.g. at the machines and their associated (and preferably optimized) operational parameters which can be selectively accessed and downloaded to the machine controller 80 of the machine 10. The database can also be periodically updated with operational information and sensed measurements from the machine 10, thus allowing off-line analysis of the operational conditions experienced by and in the machine 10 or specific components thereof.

In one embodiment, the on-board chip memory can simply include a network address pointer that allows on-line connectivity to a database of set-up parameters that establish (through down-loading to the machine controller) a baseline for machine operation.

The memory devices 76, 78 in the hot half 50 and cold half 52, in a preferred embodiment, are therefore coupled together. Similarly, with regards ancillary equipment outside of the mold, e.g. a robot 29 or post-mold cooling device, this ancillary equipment may optionally be coupled to the memory devices 76, 78 to receive stored information pertaining to component set-up or machine configuration, including timing and location/arm positioning information to achieve take-out of specific parts. Typically, an independent controller 96 at the robot receives and interprets information received from the memory devices 76, 78 to control the operation of the ancillary equipment. Of course, the machine controller 80 could provide centralized control of the ancillary equipment provided that a communication path (e.g. a common bus structure) interconnects the memory devices 76, 78 with the machine controller and the ancillary equipment, as will be readily appreciated by the skilled addressee. In this respect, a TCP/IP link (or its equivalent) may therefore also exist between memory device 76 and microprocessor 82, although this direct and optional connection has been omitted from FIG 2 for reasons of clarity.

Optionally, in another embodiment, the hot runner 54 includes a memory chip or RF tag that can be coupled to the machine controller 80; the function of this memory chip or RF tag will be described in due course.

Referring briefly to FIG. 3, a plurality of sensors 68, 70, 72 are individually coupled to a data (collection) interface 100 that provides a communication path to a memory device 76. Access to the memory is controlled by a suitable controller, such as a microprocessor 102 that is coupled to the sensors through the data interface 100. Typically, access to the microprocessor 102 is through a digital-to-analog converter 104 and, optionally, a multiplexor 106. If the microprocessor is in a distributed control system, the data interface 100 also provides information coupling to a machine controller 80.

Turning now to the functional operation of the various preferred architectural embodiments of the present invention, functional control and set up of the system of FIG. 2 can be accomplished in a number of ways.

Firstly, the machine controller 80 can request direct entry of certain information through its HMI 84. For example, in relation to mold set-up, a preferred embodiment of the present invention generates a screen prompt that asks for part parameters relating to the molded part that is to be produced.

Secondly, the control logic in the machine acts to look for and, if available, interrogate in-mold information identifying the system configuration of the system's sub-components, e.g. mold, hot runner and stack. In this context, "in-mold" information should be appreciated as being a generic description of a mechanism by which component-related operational data is stored on an on-board chip. Equally, the term "in-mold" relates an identification tag that identifies a specific part, mold or machine and which is used by the machine controller to index a dedicated configuration file in a database (located with or remote to the machine controller) that contains a multiplicity of configuration files related to different parts, molds and/or machines.

Thirdly, the machine controller monitors in real-time the operational parameters of the machine by receiving sensed signals from strategically located sensors. In a closed loop configuration, dynamic adjustment of the machine operating conditions in undertaken by the system controller.

To improve mold set-up, a preferred embodiment of the present invention requests data entry of various physical parameters of the desired molded part. More particularly, considering the instance of a preform, a control algorithm (of a preferred embodiment of the present invention) for the HMI prompts the machine operator to input weight and thickness measurements for particular zones of the preform. The thickness measurement is at least the maximum thickness measurement. With regard to the zones, any number and granularity may be used, but it is preferred that weight and thickness measures be obtained for the gate region, the threaded or neck region and the intermediate (generally cylindrical) body region between the gate and neck. This information may be entered in the form of a table, or otherwise directly onto a representative or simplified image of the preform that is generated on the display 88, as shown in FIG. 4.

Optionally, the control algorithm for the HMI additionally requests information concerning the gate diameter through which melt is injected into the cavity, the overall length of the molded part and other significant dimensions of the preform, e.g. the outside diameter of the thread. Additionally, the machine operator is preferably required to input limited but process related machine parameters, including the diameter of the shooting pot piston and the number of cavities in the mold. The density of the resin is also preferably obtained for a given operating temperature and pressure, although the a-control algorithm of the present invention may apply an averaged density. Also, preferred operating criteria on injection pressure may be selected input or downloaded into the HMI. With greater knowledge of the machine's general and specific set-up and configuration, the control algorithm and system controller are better placed to define the initial mold and machine set-up points, thereby rendering the system in an initial operating state that better approximates to the optimum or preferred operating state.

Since the cooling efficiency of the cold half is subject to the temperature differential between its cooling circuit and the resin temperature, the algorithm may optionally also compensate for varying cold half operating temperatures, although cooling circuit temperatures generally fall within a limited range of between about 5° C. and 25° C. and therefore have minimal effect when viewed in the context of the temperature of the molten resin at the injection point.

Data entry could be restricted to a component identity, provided that this component identity was used by the machine controller to gain access to a look-up table characterizing the operation parameters of that component.

Given the above identified data, the control algorithm, in calculating a fill profile, applies a weighting factor between the various zones (having different thicknesses and geometries) to compensate for differing cooling and flow characteristics arising in these varying zone geometries. More particularly, an aspect of the present invention recognizes that it is beneficial to have minimal and preferably no induced stresses within the molded part (e.g. the preform) and, furthermore, that there is constant gas venting from the cavity. On this basis, an aspect of the present invention looks to achieve a constant fill rate in which a melt front (traveling through the cavity) is at a constant speed or flow in each of the zone geometries of the preform. After initial set-up, in order to achieve or ensure a constant flow, it may still however be necessary to further refine some processing parameter (e.g. melt temperature and injection piston position) to compensate for system imbalances, but the present invention has acted to reduce the number and likely range of such parameters that may need to be addressed through an iterative revision process. Consequently, the present invention moves the mold towards an optimized set-up in reduced time, with the present invention making use of guidance provided by the mold manufacturer to simplify and possible eliminate the iterative refinement process.

The algorithm (operational within the machine controller 80) hence calculates a fill profile that, to at least a first approximation, corresponds to an optimum fill profile for the mold. As will now be understood, the fill profile will include operational set-points for: i) injection rate transition time control (when velocity to pressure control is exercised by the machine logic); ii) plunger speed; and iii) when transitions in hold pressure should occur.

The control algorithm preferably calculates set-points for additional machine operations, including extruder operation and cooling functions (both in mold and post-mold).

In an alternative embodiment of the present invention, rather than having an operator input data into the machine controller 80 via the HMI 84, a memory device in the mold (or memory devices in the respective mold halves) is arranged to download mold configuration information to the machine controller 80. In this context, mold configuration information relates to part geometry and, particularly, to physical parameters of the desired molded part (as indicated above). Download can be either automatic and driven by mold installation and power-up, or prompted by machine operator interaction. In a preferred embodiment, preform information is obtained directly from a stored construction drawing loaded into the memory, with the machine controller including a macro that extracts dimensions from an electronic construction drawing for the preform produced according to a specified template.

Once download has been accomplished, the control algorithm (in the machine controller) allows the operator to modify certain operating conditions, particularly in relation to machine operation, e.g. resin temperature settings, piston diameter and the like. Given the number of cavities (which may be included in the stored data retained in the memory device or otherwise input by the machine operator), the algorithm is then able to calculate and set the fill profile and particularly the operational set-points for: i) injection rate transition time control (when velocity to pressure control is exercised by the machine logic); ii) plunger speed; and iii) when transitions in hold pressure should occur. Once calculated, the control algorithm causes the fill profile and operational set-points to be tabulated or otherwise shown on the display 88 of the HMI 84.

Information stored in the memory devices is stored, initially, when the component (with which the memory device is directly associated) is manufactured. At times of refurbishment or conversion of that component such as cold half, a hot runner manifold or the stack configuration, the memory is updated with new technical data, including part parameters.

In addition, subject to available storage capacity, the memory device can include user instructions manuals and related technical data that can be selectively accessed by the machine controller to allow display of reference documents on the HMI 84.

Once in an operational environment of a machine, the control algorithm ensures that a back-up of the data in the memory is stored locally within the machine controller. At power down, although not essential, synchronization of data between the mold and chip is preferably undertaken, which synchronization is preferably arranged not to over-write existing data that is used for historical assessment purposes described subsequently.

As a barest minimum, the memory device needs to include a component identity number which allows the machine controller to cross-reference a database of component identity numbers to obtain a technically relevant configuration information. By simply tagging the component with an identity number (or range of identifying numbers), the level of information and complexity of the memory may be limited in the component. However, component tagging in this fashion requires that the system controller periodically be updated with a look-up table that cross-references component numbers with part parameters; this can be done through selective downloading of information to the machine controller (over the internet) or via a CD-ROM periodically sent to the customer. In other words, a component (e.g. mold) number provides a point of recognition which can be cross-referenced Into a database of operating parameters made available to the machine controller. Alternatively, the machine controller can be configured to allow a machine operator to directly access a remote database containing a listing of components and their operating characteristics, and then to download relevant operational parameters to allow the control algorithm to calculate set-up.

Alternatively, the memory devices can be substituted for an identifying tag, such as an electronic or RF tag, that can uniquely identify the component to which it is associated. Rather than using a memory device, tagging could also be accomplished with a bar-code strip containing information that can be scanned into the machine controller. In the most basic of forms, the component part number is manually entered into the machine controller, whereby the part number is cross-referenced into a database of operational parameters that is accessible by the machine controller.

With any modification to the machine set-up for a particular mold, such a modification is stored in memory associated with the machine controller. Additionally, with using an in-mold memory device, the revised and potentially manually optimized machine settings are stored in memory device 76 on or in the mold component or mold half, thereby allowing the machine set-up configuration to be transported with movement of the mold or mold half to a different machine.

In all cases, whether by download from the in-mold memory device or operator-prompted input of data, the control algorithm performs a data validation and limit check to ensure that the received data satisfies information requirements for the control algorithm and operational parameters for the molding machine. Should there be an inconsistency, or should the control algorithm generate an out-of-range error, the machine operator is notified through a sensory alert from the HMI 84. Downloading of information to the in-mold memory device optionally requires security access in the form of a validated password; this presents erroneous overwriting or malicious tampering with stored molding information.

The present invention also contemplates the setting-up of a machine based on prior experiences with a similar machine; this requires either the use of a look-up table or the direct entry of operational parameters and equipment specification of the local molding machine into which a new component is to be installed. In entering the parameter information about the mold or component into the machine controller, the control algorithm identifies an inconsistency between recommended machine settings (stored in the memory device on the component) and the operational capabilities of the customer's local molding machine. Through use of manual input through the HMI 84 or system knowledge available to the machine controller, the control algorithm identifies the configuration differences that give rise to operational discrepancies (especially in terms of set-up) and provides an option for set-up conversion based on extrapolated or projected machine processing characteristics of similar systems documented in an accessible look-up table or conversion calculation.

By way of more particular example, a new mold, having an associated memory chip (i.e. in-mold memory) supporting optimized operational process settings data and machine configuration data, is installed into a customer's machine. With the optimized process data configured on a test rig that varied in configuration to the customer's machine, e.g. the clamp size and shooting pot are different, the control algorithm converts test rig optimized data to customer machine optimized data using a set of equations or look-up data based on customer machine parameters and characteristics. The fill-profile and set point control for the new mold in the customer machine is therefore modified, to a first approximation, to the optimized set-up. Alternatively, the control algorithm may access a database of machine configurations to identify an earlier configuration most closely resembling the customer's machine. Once a similar machine has been identified, set-up by the control algorithm of the customer's machine is based on the machine set-up of the earlier, but similar, machine. Should there be a fundamental incompatibility between the test rig set-up and the customer's machine (as identified by significant variations in system components), the control algorithm generates a suitable alert that is presented through the HMI 84.

Subject to available memory storage capacity, the in-mold memory device may optionally include access to a service history, including maintenance notes specific to a mold or generic to the mold-type.

In a fully sensed system, the machine controller 80 is configured to interrogate the various system components to obtain, through handshaking of information, an understanding of what components and what operating parameters are connected to the system. The machine controller thus selectively accesses memory devices that are permanently associated with particular system components, such as the cold half, the hot half or the stacks, to obtain the necessary configuration data for subsequent calculation purposes in its set-up control algorithm.

In another embodiment, each of the major components in the system is tagged electronically to allow the system controller to interrogate all components within the system to identifying operational parameters. If the machine controller fails to establish a valid data verification or "handshake", the machine controller may default to a manual set-up configuration.

In a sensed system, further benefits can be derived, over time, through monitoring and recording of sensor inputs. The plurality of sensors 66-74 located in or on a molding machine (especially in the mold or platen) accumulate machine operational data that is communicated and stored in a memory for subsequent statistical analysis. The analysis can be made by either a technician obtaining access to the stored information through the HMI, or otherwise by downloading the stored historical machine performance information to an off-site location, e.g. the manufacturer's service facility. By obtaining the historical data from multiple machines or molds, the machine manufacturing is able to identify performance trends across their product platform and to undertake appropriate design change, especially to address service issue arising from repetitive problems.

Additionally, the sensed environment supports closed loop control of operational machine processes, as will be readily appreciated.

In addition, a preferred embodiment of the present invention uses sensors 66-74 to monitor and support recording of individual cycle parameters, such as:

i) the number of cycles executed by the mold (or specific mold components);

ii) the maximum and average applied tonnage;

iii) the average and minimum cycle times;

iv) the ejection speed;

v) the average, maximum and minimum temperatures experienced in various parts of the mold half and components, including the melt distribution system, e.g. the runner system; and vi) other machine and mold events, such as alarms.

Based on the foregoing history, service technicians are able to assess whether and for what periods the machine has been operating within specification.

Sensed cycle information is stored in memory associated with the machine controller 80, which cycle information is preferably stored by continuously updating calculated averages and absolute measurements with the most recent data, thereby limiting the overall size of the memory.

With sensor monitoring, a preferred embodiment of the present invention has a machine controller configured to report (both at the HMI and a remote service centre) the imminent or actual failure of a component. A service technician at the service centre can instantly schedule service armed with information pertaining to the likely problem, thereby improving service support to the customer.

A centralized database, such as database 92 of FIG. 2, is preferably regularly updated with all new mold components and related operational parameters to support development of a fully-understood technology platform. With knowledge of component capabilities, increasing intelligence may be added to the molding machine's control logic to make use of accumulated, historical knowledge and to optimize component performance by providing remote system control (of the system controller) and process re-optimization.

With a writable memory device, the machine controller is optionally configured to write the machine number into the memory device to provide an historical trace of mold movement. To ensure data is kept updated, the machine controller is further arranged cause a prompt to the user at the time of machine set-up or mold installation into the platen, whereby certain information is entered into the controller and downloaded to the memory associated with the mold component, e.g. the cold half or the hot runner or a robot.

To address potential issues of component non-compatibility (as well as potential counterfeiting and plagiarism of intellectual property in the design of a mold) a preferred embodiment of the present invention has the machine controller cooperate with memory chips located in both the hot half 50 and cold half 52 of the mold. Without receipt of an authentication code that establishes component compatibility and origin, mold operation is entirely inhibited or restricted to basic functionality, e.g. to ensure that there is no mold/machine damage. Alternatively, if there is no recognition, the machine controller may be configured to generate and, optionally, send a report to indicate that the mold is being used with a suspected counterfeit or clone. In certain instances it is contemplated that it may be desirable to always associate a specific hot half with a specific cold half as a mated pair, whereby unique coded and complementary identities only operate together.

In another aspect of the present invention, with the location of pressure sensors either on the mold surface, within the stack components and/or relative to the force closure path of the platen and tie-bars, microprocessor control of the applied clamp closure tonnage is contemplated. More specifically, rather than developing full closure tonnage for a substantial portion of the duration of the injection cycle, the present invention contemplates closed loop control of the clamp pressure (through control of the hydraulic pistons or their functional equivalent) dynamically to adjust the clamp pressure to reflect, i.e. balance and preferably slightly exceed, the instantaneous injection pressure. Preferably, a safety margin (perhaps an over pressure of between about 2% to 10%, but at least no more than about 25% to 50%) is preferably built into the system to ensure that effective mold closure is obtained and guaranteed. In this way, the system of the preferred embodiment consumes less power and component wear is reduced. Pressure sensing could be achieved through surface mounted sensors and by measuring the hydraulic and/or cavity pressures. Alternatively, or additionally, the system could also monitor mold movement (and particularly mold and tie-bar location).

Referring to FIG. 5, a graphical representation of applied tonnage over time is illustrated. In this diagram, two alternative approaches are shown. A first approach mimics the injection pressure profile with time, whereby applied tonnage with time is varied according to closed loop control (achieved through sensing and measurement by appropriately located pressure sensors).

A second approach looks to pre-stored or historically accumulated injection pressure information and, instead of varying the tonnage, applies a constant tonnage. However, rather than applying all the available clamp tonnage that can be developed by the clamp assembly, the second approach looks to the maximum recorded/likely injection pressure to be experienced in the mold (as stored in a look-up table associated with the particular mold configuration) and then elevates this maximum pressure by a safety margin of between about 2% and 10%, thereby identifying an optimized clamp tonnage. The machine controller then causes the application of a constant applied tonnage (essentially only during the injection and hold cycles) that corresponds to the optimized clamp tonnage.

Furthermore, with the use of a memory chip (in additional to closed loop control for the applied tonnage), a predefined pressure drop model for the specific configuration of the system(s) could be stored with the mold. Consequently, by interrogating the memory, the profile of tonnage application would be accessed and loaded into the control system as control parameters. Again, by this time using a modeled tonnage profile (which itself could be based on empirically derived results for different mold types and cavitations), dynamic tonnage control is exercised in relation to the injection and hold cycles, thereby reducing the average pressure applied on the components of the mold.

In overview, with respect to applied clamp tonnage, the sensors and/or memory chip allow the machine controller to apply either: i) minimum closure tonnage based on pressure measurements; or ii) variation of closure tonnage over time based on either measured physical parameters of the mold or molded article.

Since the machine controller is ultimately responsible for machine control, it is preferred that all memory devices and ancillary controllers are responsive to the machine controller, thereby ensuring that a single point write function is achieved.

It will, of course, be appreciated that the above description has been given by way of example only and that modifications in detail may be made within the scope of the present invention. For example, while the preferred embodiment has focused on implementation of the present invention in a multi-cavity preform manufacturing environment, the present invention can find equal application in other technologies in which a mold shoe (associated with a part, such as in a thixomolding environment) is interchangeable over time between many machines having slightly different system configurations. Similarly, while the preferred embodiments contemplate the molding environment to be PET (polyethylene tetraphthalate), the inventions are applicable to other molding environments for plastic and metal, e.g. polycarbonate and thixomolding, respectively.

While it is advantageous to operate the memory and sensor devices in a complementary sense, it will be understood that the concepts of the present invention relating to the use of memory (or the entry of component identifying information into the machine controller) in any of the aforedescribed set-up procedures can be implemented independently of a sensor based system.

While the preferred embodiments have focused detailed explanation in relation to the hot and cold halves of a mold, the present invention can also find utility and application in other system components, e.g. the robotics.

What is claimed is:

1. An injection molding machine, comprising:
    a human machine interface being configured to provide graphical representation of a status of the injection molding machine;
    a machine controller being configured to: (i) provide operational control of the injection molding machine, (ii) operationally couple with the human machine interface, the machine controller having: (i) a machine-controller processor; and (ii) machine-controller memory being coupled with the machine-controller processor;
    an injection unit being configured to plasticizing and inject a molding material;
    a tie-bar clamping mechanism being associated with the injection unit; and
    a mold assembly being supported by the tie-bar clamping mechanism, the mold assembly being coupled with the injection unit, the mold assembly being adapted to receive the molding material from the injection unit so that a molded article may be molded, and the mold assembly including:
        a mold assembly body; and
        a mold memory device being coupled with the mold assembly body, the mold memory device being readable by the machine controller, and the mold memory device including:
            data being associated with the mold assembly.

2. The injection molding machine according to claim 1, wherein:
    the data includes:
        mold set-up data being related with the molded article to be molded in the mold assembly.

3. The injection molding machine according to claim 1, wherein:
    the data includes:
        mold set-up data being related with the molded article to be molded in the mold assembly, and the mold set-up data defines the molded article in terms of a plurality of zones having differing thicknesses and geometries.

4. The injection molding machine according to claim 1, wherein:
    the data includes:
        mold set-up data being related with the molded article to be molded in the mold assembly, and the mold set-up data defines the molded article in terms of a plurality of zones having differing thicknesses and geometries, and the mold set-up data includes:
            a plurality of weighting factors designed to at least partially compensate for differing cooling and flow characteristic within the molded article.

5. The injection molding machine according to claim 1, wherein:
    the data includes:
        mold set-up data being related with the molded article to be molded in the mold assembly, the mold set-up data defines the molded article in terms of a plurality of zones having differing thicknesses and geometries, and the mold set-up data defines the molded article in terms of a fill rate for each of the plurality of zones, and the fill rate defining a substantially constant speed or flow for a melt front that is expected to flow within each of the plurality of zones.

6. The injection molding machine of claim 1, wherein:
    the data includes:
        mold configuration information, and the machine controller, based on the mold configuration information, allows an operator to modify selected operating conditions associated with machine operation.

7. The injection molding machine of claim 1, wherein:
    the data includes:
        technical data being associated with the molded article.

8. The injection molding machine of claim 1, wherein:
    the data includes:
        a user instruction manual being accessed by the machine controller to allow display of the user instruction manual on the human machine interface.

9. The injection molding machine of claim 1, wherein:
    the data includes:
        a component identity number being configured to allow the machine controller to cross-reference a database having component-identity numbers to obtain configuration information.

10. The injection molding machine of claim 1, wherein:
    the data includes:
        a component identity number providing a point of recognition which can be cross-referenced into a database of operating parameters made available to the machine controller.

11. The injection molding machine of claim 1, wherein:
    the data includes:
        a bar-code strip identifying a component being associated with the mold memory device.

12. The injection molding machine of claim 1, wherein:
    the data includes:
        an authentication code that establishes component compatibility and origin, mold operation is enabled.

13. The injection molding machine of claim 1, wherein:
    the data includes:
        a predefined pressure drop model for a configuration of the injection molding machine.

14. The injection molding machine of claim 1, wherein:
    the data includes:
        an indication indicating whether the machine controller may apply any one of: (i) minimum closure tonnage based on pressure measurements, and (ii) variation of closure tonnage over time based on either measured physical parameters of a mold or the molded article.

15. The injection molding machine of claim 1, wherein:
    the data includes:
        information pertaining to at least one of:
            a fill profile for the molded article to be molded; and
            set point control for a mold.

16. The injection molding machine of claim 1, wherein:
the mold assembly body includes:
  a mold being coupled with the mold memory device.

17. The injection molding machine of claim 1, wherein:
the mold assembly body includes:
  a hot runner being coupled with the mold memory device.

18. The injection molding machine of claim 1, wherein:
the mold memory device includes:
  an electronic memory;
  a data interface being coupled with the electronic memory, and being configured to couple with the machine controller; and
  a memory-device microprocessor being coupled with the data interface.

19. The injection molding machine of claim 1, further comprising:
  a mold sensor being coupled with the mold assembly body, the mold sensor being coupled with the mold memory device, the mold memory device being configured to store the data being provided by the mold sensor, the mold sensor being configured to measure a variable parameter being associated with a mold operation of the injection molding machine.

20. The injection molding machine of claim 1, wherein:
the machine controller is configured to communicate with a database, and the database containing operational parameters associated with the injection molding machine, and
the data includes:
  a network address pointer being usable by the machine controller to access a set-up parameter being located in the database.

21. The injection molding machine according to claim 1, wherein:
the data includes:
  an identification tag identifying the mold assembly.

* * * * *